United States Patent [19]
Gupta et al.

[11] Patent Number: 5,996,083
[45] Date of Patent: Nov. 30, 1999

[54] MICROPROCESSOR HAVING SOFTWARE CONTROLLABLE POWER CONSUMPTION

[75] Inventors: Rajiv Gupta, Los Altos; Prasad Raje, Fremont, both of Calif.

[73] Assignee: Hewlett-Packard Company, Palo Alto, Calif.

[21] Appl. No.: 08/514,284

[22] Filed: Aug. 11, 1995

[51] Int. Cl.$^6$ .................................................. G06F 1/00
[52] U.S. Cl. ........................................ 713/322; 713/324
[58] Field of Search ................................. 395/750, 307, 395/310; 364/707

[56] References Cited

U.S. PATENT DOCUMENTS

| | | | |
|---|---|---|---|
| 4,991,078 | 2/1991 | Wilhelm et al. | 364/200 |
| 5,142,684 | 8/1992 | Perry et al. | 395/750 |
| 5,167,024 | 11/1992 | Smith et al. | 395/375 |
| 5,222,239 | 6/1993 | Rosch | 395/750 |
| 5,230,074 | 7/1993 | Canova, Jr. et al. | 395/750 |
| 5,276,889 | 1/1994 | Shiraishi et al. | 395/750 |
| 5,388,265 | 2/1995 | Volk | 395/750 |
| 5,392,437 | 2/1995 | Matter et al. | 395/750 |
| 5,420,808 | 5/1995 | Alexander et al. | 364/707 |
| 5,471,625 | 11/1995 | Mussemann et al. | 395/750 |
| 5,553,244 | 9/1996 | Norcross et al. | 395/280 |
| 5,603,037 | 2/1997 | Aybay | 395/750 |

OTHER PUBLICATIONS

Suessmith, Brad W. and Paap, George III, "Power PC 603 Microprocessor Power Management," *Communications of the ACM*, Jun. 1994 pp. 43–46.

*Microprocessor Report*, Oct. 31, 1990, vol. 4, No. 19.

Understandingx86 Microprocessors, *Microprocessor Report*, Sep. 1987 to Apr. 1993.

Krick et al., "A 150 MHz 0.6 μm BiCMOS Superscalar Microprocessor," *IEEE Journal of Solid–State Circuits*, vol. 29, No. 12, Dec. 1994, pp. 1455–1458.

*Primary Examiner*—Ayaz R. Sheikh
*Assistant Examiner*—Jigar Pancholi

[57] ABSTRACT

A microprocessor is provided which includes a power control register for controlling the rate of execution and therefore the power consumption of individual functional units. The power control register includes a plurality of fields corresponding to the functional units for storing values that control the power consumption of each. The power control register fields can be set by software which has the much greater ability to look out into the future to determine whether the functional units will be required. The functional units are responsive to the corresponding power control register field to adjust their rate of execution responsive to the value stored therein. The rate of execution can be controlled in a number of different ways: dividing down the clock; removing power to the functional unit; disabling the sensor and/or buffer driver of one or more of the ports in a multi-ported RAM; removing data from the functional unit; and changing the data bus width responsive to the control register field. The microprocessor also includes a latency control register which assures that the functional unit is operational after the functional unit is placed from a low power state to a more fully operational state by changing the corresponding field in the power control register.

36 Claims, 8 Drawing Sheets

MICROPROCESSOR HAVING SOFTWARE CONTROLLABLE POWER CONSUMPTION

BACKGROUND OF THE INVENTION

This invention relates generally to power management techniques and more particularly to the application of the same to computer systems.

Power management in computer systems has become increasingly important with the advent of laptop and notebook computers. These portable computers operate on batteries, usually nickel-cadmium (nicad) or nickel-metal-hydride. Unfortunately, advances in battery technology have not kept pace with the increasing power demands of modern portable computers. The shift from black and white to color displays has added a tremendous additional demand on power as well as the increases in microprocessor clock rate and main memory size.

In order to extend the battery life, computer systems have employed so called "power management" techniques. These techniques attempt to minimize the power consumption of the system by reducing the power consumption of the individual subsystems of the overall computer system. An example of a prior art computer system 10 having power management is shown in FIG. 1. This system 10 includes a central processing unit (CPU) or microprocessor 12, a keyboard 16, a disk 18, a display 20, a main memory subsystem 22, and an I/O subsystem 24. The CPU 12 is coupled to the subsystems over a bus 14. There are two primary power management techniques. The first is controlling the clock rate of the subsystems and the second involves controlling the power provided to the same, i.e., turning off of idle components.

As is known in the art, power consumption of a CMOS integrated circuit (IC) is directly proportional to the switching frequency of the IC. The switching frequency is in turn controlled by the clock rate provided to the IC. Accordingly, by adjusting the clock rate, the power consumed by the IC can be reduced. The system 10 takes advantage of this by reducing or even stopping the clock signal provided to the various subsystems under certain conditions. Those conditions are typically that the subsystem has been idle for a predetermined amount of time. The activity is monitored by the microprocessor 12 by detecting either writes or reads at predetermined memory locations. If no such memory activity has occurred within a predetermined period of time, the microprocessor assumes that it can safely shut down the subsystem without adversely effecting the system.

The system 10 also includes five switches S1–S5 that are individually controllable by the microprocessor 12. These switches can either control the power supplied to the corresponding subsystems or, alternatively, the clock frequency supplied thereto. In the event the switch controls the clock frequency there is also a corresponding clock divider circuit (not shown) that divides down the clock signal, typically in multiples of two, or reduces the clock frequency to zero. The microprocessor 12, after detecting the predetermined idle period, sets the switch such as switch S3 by asserting a signal on a corresponding line coupled between the microprocessor and the switch such as line 26. This causes the switch to switch to the appropriate state, which thereby causes either the clock or power to be adjusted. When the subsystem becomes active the microprocessor 12 deasserts the signal thereby switching the state back to its normal position, which either sets the clock frequency to its normal operating frequency or reapplies power to the subsystem.

In either case the subsystem is typically not immediately available after the microprocessor activates or "wakes up" the subsystem. Accordingly, the microprocessor 12 must wait a predetermined amount of time before the subsystem is fully functional again. This is typically handled by an interrupt service routing which is invoked by a non-maskable interrupt. The interrupt service routine then insures that the subsystem is fully operational before passing control back to the system level application that attempted to access the subsystem. Such is the system implemented by Intel in its Intel 486SL, Advanced Micro Devices AM386DXLV, and Chipset Technologies Superstate system management architecture.

All of these techniques focus on reducing the power of the individual subsystems. Although the clock rate of the microprocessor can be reduced (such as shown in FIG. 1), this provides a very coarse level of control over the power dissipated by the microprocessor itself. Moreover, reducing the clock frequency produces a proportional decrease in the performance of the system. The microprocessor 12 goes to sleep except for some internal logic that monitors the bus activity.

Several other approaches have focused on power management at the microprocessor or "chip" level rather than at the system level. These chip-level approaches dynamically "sense" the instructions in the instruction stream and shut-down the whole chip or portions of the chip not required to execute those instructions. The PowerPC microprocessor, a joint development effort by IBM, Motorola and Apple Computer, uses such an approach. In the PowerPC there are four different power states: Full On, Doze, Nap, and Sleep. The PowerPC architecture includes a three power-saving mode bits that specify which of these four modes the chip is placed in. Software, typically the operating system, sets the mode by writing an appropriate value to the three power-saving mode bits. When set in the "Full On" power mode, the Dynamic Power management hardware of the PowerPC microprocessor disables those functional units not required to execute the instructions of the instruction stream that have been received by the microprocessor by removing or gating the clock from those functional units. In the "Doze" mode, all functional units are disabled by the same method, with the exception of the bus snooping logic and time base decrementer. The bus snooping logic is additionally disabled in the "Nap" mode. In the least consumptive "Sleep" mode, the system clock (SYSCLK) can be removed and the phase-locked-loop (PLL) disabled.

The Pentium microprocessor manufactured by Intel uses a similar approach to reduce power consumption of its internal floating point unit. The Pentium dynamically senses the current instructions and shuts down the clock for that unit when there is no floating point activity, i.e., no floating point instructions are being sent to the floating point unit.

U.S. Pat. No. 5,388,265 to Volk entitled "Method and Apparatus for Placing an Integrated Circuit Chip in a Reduced Power Consumption State" uses a similar approach except this approach dynamically turns off the entire chip when a certain lack of chip activity is detected. The turn off is performed by dedicated hardware that monitors the activity and reduces the power consumption of the entire chip. U.S. Pat. No. 5,276,889 to Shiraishi et al., entitled "Microprocessor having Built-in Synchronous Memory with Power-Saving Feature" reduces the power consumption of an on-chip synchronous memory by disabling the memory when the memory is not required by the currently executing instructions. An instruction decoder dynamically monitors the instruction stream and deasserts a memory enable signal to turn off the memory when instructions that do not use the memory are executed.

The problem with these "dynamic" approaches is that they impose a burden on the hardware to monitor and detect the instruction stream. This may compromise the clock cycle time in a heavily pipelined microprocessor. In addition, the hardware has difficulty looking ahead to determine whether certain instructions are going to be issued. The detection circuitry can check the queued instructions in the instruction buffer; however, this provides an advance warning of only a limited number of instructions. This advance warning may be insufficient to have the functional unit fully operational before the instruction is to be executed. Thus, the pipeline must be stalled in order to allow the unit to wake up.

Another approach is taught in U.S. Pat. No. 5,142,684 to Perry, et al. entitled "Power Conservation in Microprocessor Controlled Devices." That approach uses two processors— one high speed processor which runs foreground tasks at variable speeds and a low speed processor which executes background tasks. The low speed processor invokes the high speed processor only when computationally intensive foreground tasks are scheduled. This conserves power by using the low speed processor for most tasks and only using the high-speed, and therefore high power consumption, processor when required. A further level of power control is provided by software. Embedded in each subroutine is a clock control code that controls the clock rate of the high-speed processor clock. The high-speed processor reads this code and then writes the code out to an application specific integrated circuit (ASIC), which divides down the high-speed clock by a predetermined amount depending on the value of the code. Thus, an entire task is run at a given clock speed. The problem with this approach is that it requires a second processor, which adds cost and complexity to a design.

Accordingly, a need remains for a microprocessor with power management facilities, which does not suffer from the problems of the prior art.

SUMMARY OF THE INVENTION

A microprocessor is provided which includes improved power management facilities. The microprocessor includes a power control register that includes a plurality of fields for individually controlling the power consumption of the individual functional units within the microprocessor. The power control register fields can be set by software which has the much greater ability to look out into the future to determine whether the functional units will be required. This allows the microprocessor to shut down or adjust the execution rate of any one of the functional units when the software determines that the functional unit is not required by the currently executing software. This offloads the task of dynamically sensing and decoding instruction activity from the hardware to the software. In addition, software control permits power management capabilities not possible with hardware. For example, software can disable branch prediction hardware during execution of a certain block of code in order to save power. The software can also slow or shut down an external bus interface to main memory in the event a certain block of code is expected to fit entirely within an internal cache. Software possesses knowledge that is unavailable to hardware and can thus make more informed power management decisions that have the least impact on performance.

The functional units are responsive to the corresponding power control register field to adjust their rate of execution responsive to the value stored therein. The rate of execution can be controlled in a number of different ways. First, the clock signal provided to the functional unit can be divided down responsive to the power control register field. This can be at an individual functional unit level such as where the functional unit is an I/O unit or at the global microprocessor level. Second, the rate of execution of the functional unit can be adjusted by removing power to the functional unit responsive to the power control register field. This can be accomplished by interposing a gating transistor between the functional unit and ground or, alternatively, between the functional unit and the supply voltage ($V_{dd}$). In a third approach, used where the functional unit is a multiported random access memory (RAM), the sensor and/or buffer driver of one or more of the ports in the RAM are disabled responsive to the power control register field. By disabling one of the ports, the throughput or execution rate of the multiported RAM is reduced as is the power dissipated thereby. This is an example of a fourth and more general approach of removing data from the functional unit responsive to the control register field. This can be accomplished by disabling the tri-state buffers coupled between the data bus and the functional unit. In yet another approach, the power control register field can be used to switch between a 32 and 64 bit external interface to reduce the power of the I/O unit. This list of approaches is not exhaustive but illustrative of the power of the software approach to internal power management of a microprocessor.

In another aspect of the invention, the microprocessor includes a power latency register that stores a power latency value (PLV) in units of clock cycles. When the software issues an instruction to "wake up" (i.e., increase the activity and therefore power consumption level of) a functional unit by writing a value to the power control register, the unit will take some number of cycles before it becomes available. The PLV value represents the assumption by the software of how many cycles this wake up will take for the functional unit in question. This means the instruction stream is guaranteed to have no instructions that are relevant to the functional unit for PLV number of cycles after the unit's power latency register has been written. The *actual* number of cycles (ALV) it takes for a unit to become available is stored in the functional unit. This value is simply compared with the PLV value. If the unit becomes available sooner than PLV number of cycles, no action is necessary. If the unit is going to take longer than PLV number of cycles to become available, it asserts a stall signal to stall further execution until it does become available. The power latency register therefore frees the functional unit from having to dynamically monitor the instruction stream when it is in a low power state to watch for instructions that require response from the unit. This is significantly less complex than dynamically sensing the instructions. In the preferred embodiment, two down-counters and some combinational logic are required to implement this feature.

Software can schedule instructions to wake up a unit such that the PLV values are larger than the ALV values for the particular target chip implementation. A different chip implementation, with different methods for functional unit turnoff, can have different ALV values. The mechanism described above allows for correct execution of the same unchanged software on the different implementation without any error, i.e., code compatible. Moreover, the ALV values of an implementation can be queried by the software to optimize the functional unit turnoff for a particular implementation.

The foregoing and other objects, features and advantages of the invention will become more readily apparent from the following detailed description of a preferred embodiment of the invention which proceeds with reference to the accompanying drawings.

DETAILED DESCRIPTION

Figure 2:
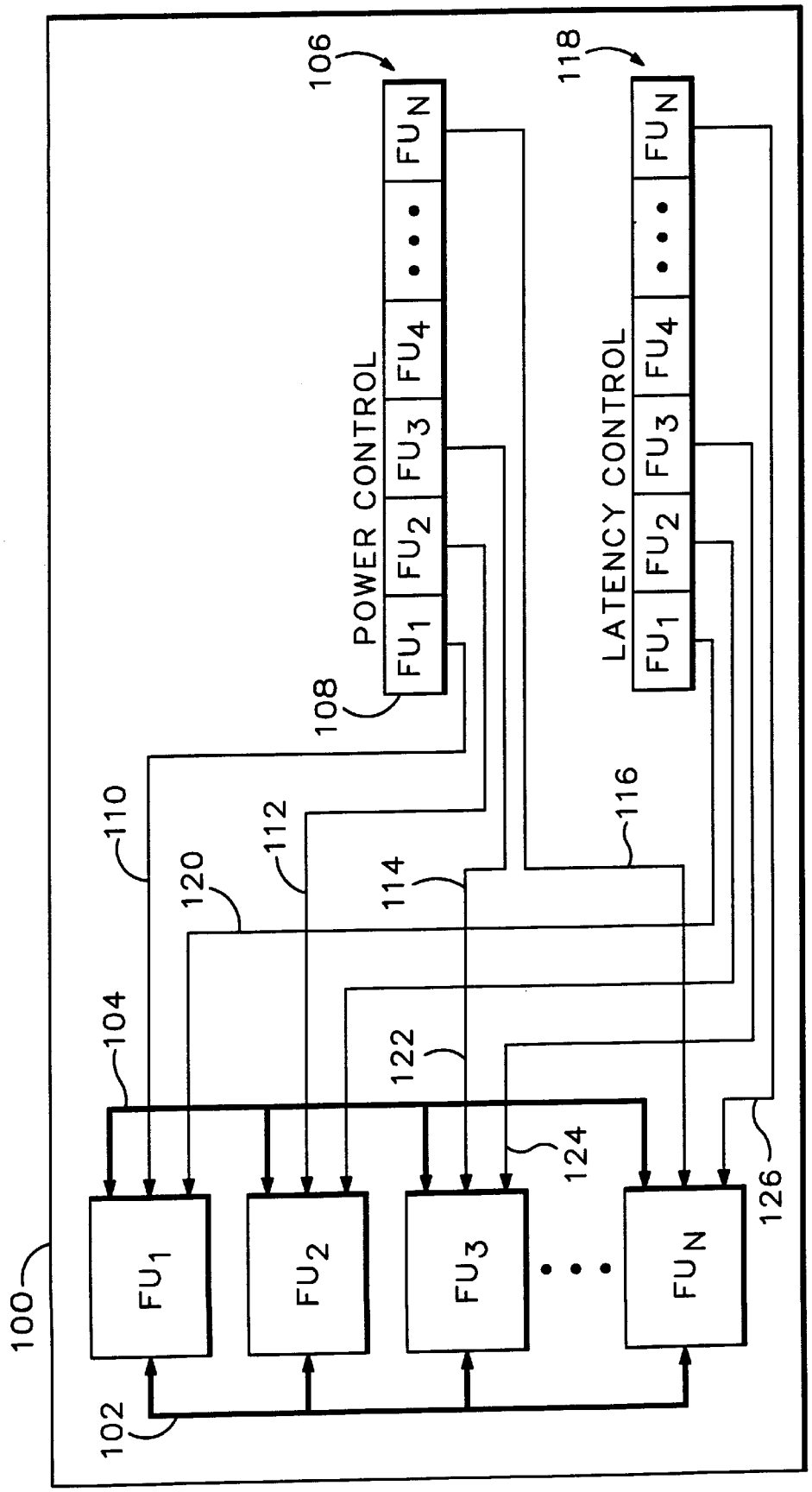
FIG. 2 is a microprocessor according to the invention having software controllable power management.

Referring now to FIG. 2, a microprocessor 100 according to the invention is shown. The term microprocessor is used herein to refer to ICs that execute instructions, whether in microcode or object code, to perform a given task. Accordingly, microprocessor as used herein includes conventional CPUs as well as digital signal processors (DSP), microcontrollers, co-processors, data-converters, etc. The microprocessor includes a plurality of functional units $FU_1$–$FU_N$. A functional unit is defined herein as a group of combinatorial and/or sequential logic organized to perform a particular function. Thus, the typical functional units are included in this definition: integer multiply, divide, add and subtract; floating point multiply, divide, add, subtract; and load/store. Also included in this definition, however, are other units including: input/output (I/O); multimedia unit; multiported cache memory unit; register file; instruction dispatch unit; branch prediction unit; register save engine; data bus; and other units dedicated to performing a given function or task.

The functional units are interconnected by buses 102 and 104 which provide data, address and control information to the various functional units. Also included in the microprocessor 100 is a power control register 106. The power control register 106 includes a plurality of fields for storing values. These values can be set by software or during the manufacturing process. Each field corresponds to a respective functional unit. Each power control register field, such as field 108, adjusts the execution rate and therefore the power dissipation of the corresponding functional unit. This control is performed in a variety of ways as described further below. Each power control register field is coupled to the corresponding functional unit via a respective bus. For example, bus 110 couples the field 108 to the functional unit $FU_1$ to provide the value stored therein to the functional unit. Buses 112, 114 and 116 similarly provide the contents of the other power control register fields to the remaining functional units. The power control register 106 can also include additional fields, which are not coupled to a functional unit, for future expansion of the microprocessor architecture or for global power management control of the microprocessor 100. These fields can be one or more bits in width depending upon the resolution of control desired.

The microprocessor 100 also includes a latency control register 118. This register 118 also includes a plurality of fields, with each field corresponding to a functional unit. As with the power control register fields, the fields of the latency control register are provided to the functional units via buses. 120, 122, 124 and 126. As will be described further below, with reference to FIGS. 10 and 11, the value stored in the latency control register field correspond to an assumption made by a compiler as to the number of clock cycles required for the corresponding functional unit to become fully operational after the functional unit has been placed back online by writing a predetermined value to the corresponding power control register field. The operation of the latency control register fields will become more apparent in the description included herein below.

Figure 3:
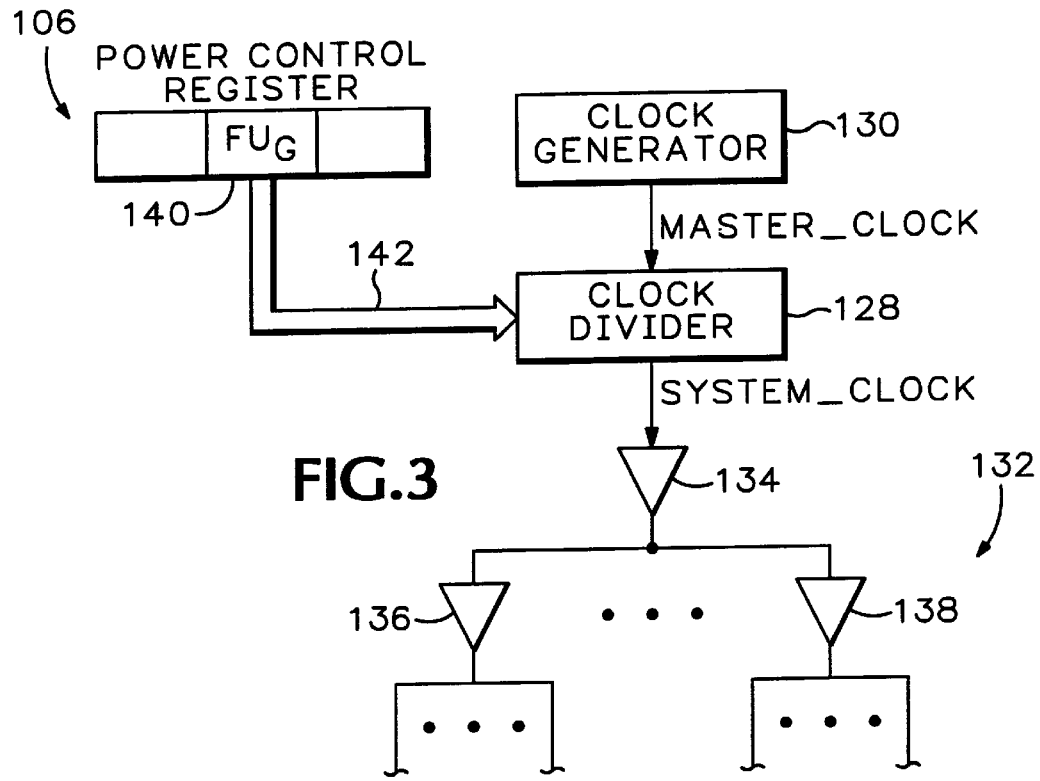
FIG. 3 is a block diagram schematic of one aspect of the power management capability of the microprocessor of FIG. 2.

Referring now to FIG. 3, a first approach to reducing the rate of execution and therefore the power dissipation of the functional unit is shown. In this approach, a clock divider 128 is coupled to a clock generator 130 for dividing down a master clock signal generated by the clock generator. The clock divider network receives the master clock and produces a system clock signal that is distributed over the microprocessor via a clocking tree 132. The clocking tree 132 includes a plurality of clock buffers 134, 136 and 138, as is known in the art, for minimizing the clock delay and clock skew throughout the microprocessor.

The clock divider 128 is coupled to a global power control register field 140 for receiving a value stored therein. This global register field 140 is not dedicated to a particular functional unit but instead adjusts the rate of execution of all the functional units by controlling the clock frequency supplied to all the functional units. The value stored in field 140 is provided to the clock divider 128 over bus 142. The clock divider divides down the master clock signal responsive to the value stored in the power control register field 140. The clock divider divides the master clock signal down in accordance with the value stored in field 140. The extent to which the master clock signal is divided down depends upon the number of bits in the register field 140. In the preferred embodiment, the clock divider divides the master clock signal down by integer ratios (e.g., ½, ⅓, ¼ . . . ¹⁄₁₆) responsive to a corresponding values stored in field 140. The amount of resolution is a function of the number of bits in the power control register fields and can thus be set by the designer. A predetermined value can also be used to divide the master clock signal down to zero.

Figure 4:
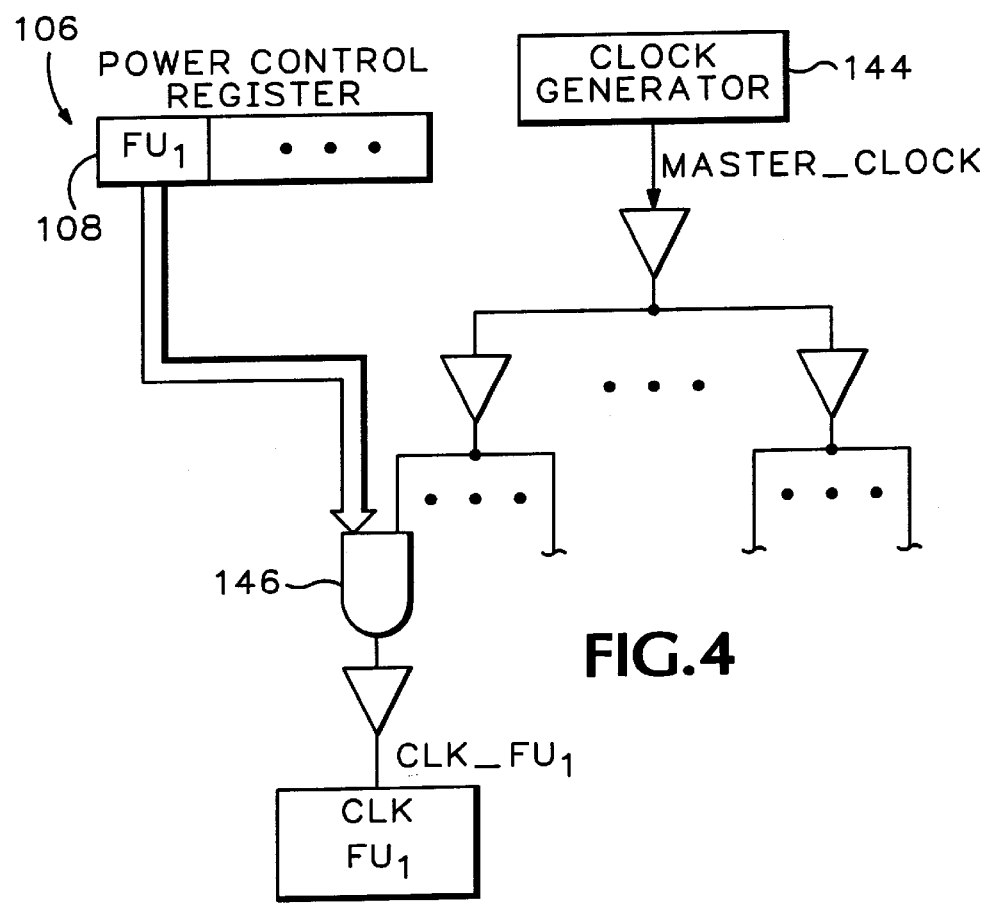
FIG. 4 is a block diagram schematic of a second aspect of the power management capability of the microprocessor of FIG. 2.

This approach can be used for each functional unit wherein the corresponding power control register field would adjust the clock rate supplied to that particular functional unit such as shown in FIG. 4; however, most pipeline microprocessors require a single clock frequency throughout. For those implementations that do not require a unified clock signal, individual clock divider circuits can be used.

Referring now to FIG. 4, a second approach to adjusting the rate of execution of the functional units in order to adjust or reduce the power consumption is shown. In this approach, the clock signals provided to the individual functional units are gated responsive to the value stored in the corresponding power control register field. As in FIG. 3, clock generator 144 produces a master clock signal, but instead of dividing down the master clock signal, the clock signals that are provided to the individual functional units are gated by an AND gate such as AND gate 146. AND gate 146 prevents the master clock signal from being distributed to the functional unit $FU_1$ unless the value stored in the power control register fields 108 is all binary ones. In this way, the clock signal can be selectively applied and removed from the functional unit depending upon the value stored in the corresponding power control register field 108. It should be apparent that this approach is not limited to a value of all binary ones but rather this is the preferred embodiment given that no additional current logic is required to gate the clock signal.

Figure 5:
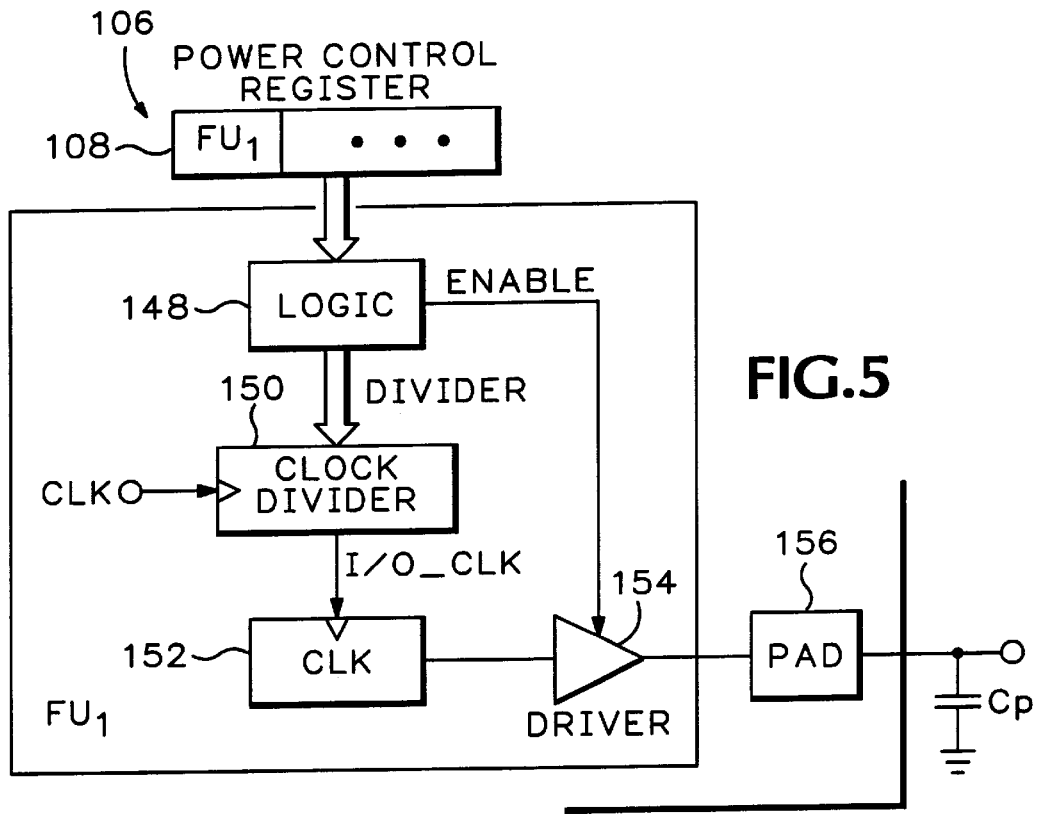
FIG. 5 is a block diagram schematic of a third aspect of the power management capability of the microprocessor of FIG. 2.

Referring now to FIG. 5, a different approach is shown for where the functional unit is an input/output (I/O) unit. In that case, the functional unit includes a logic block 148 that is coupled to the corresponding power control register field 108 to receive the value stored therein. The logic block 148 produces two outputs. The first is a clock divider output that is provided to a clock divider 150 such as that described in FIG. 3. The clock divider output of the logic block 148 is used by the clock divider 150 to determine the clock rate of the I/O_CLK output of the clock divider. The I/O_CLK signal is provided to a clock input of an output latch 152. The output latch is used to gate or latch the data output of the I/O functional unit. Thus, the I/O rate of the functional unit can be adjusted by changing the value stored in the corresponding power control register field 108. Therefore, the power dissipated by the functional unit, which is a function of the I/O rate, can be adjusted by varying the value in that field.

The second output of the logic block 148 is an enable signal that is coupled to an output driver 154. This output driver 154 is a tri-state driver, which is placed into a high impedance state when the enable signal is deasserted. The output of the driver is coupled to a pad 156 that provides for external connections to the microprocessor, as is known in the art. By disabling the driver, the microprocessor can effectively reduce or minimize the power consumption due to the charging and discharging of parasitic capacitances $C_P$ connected to the pad 156. The logic block 148 in the preferred embodiment deasserts the enable signal responsive to a predetermined value stored in the power control register field 108. The logic block also provides a divider value that is provided to the clock divider 150, which determines the resulting clock rate. Thus, two levels of control are provided by this approach to reduce the execution rate and, therefore, the power dissipation.

Figure 6:
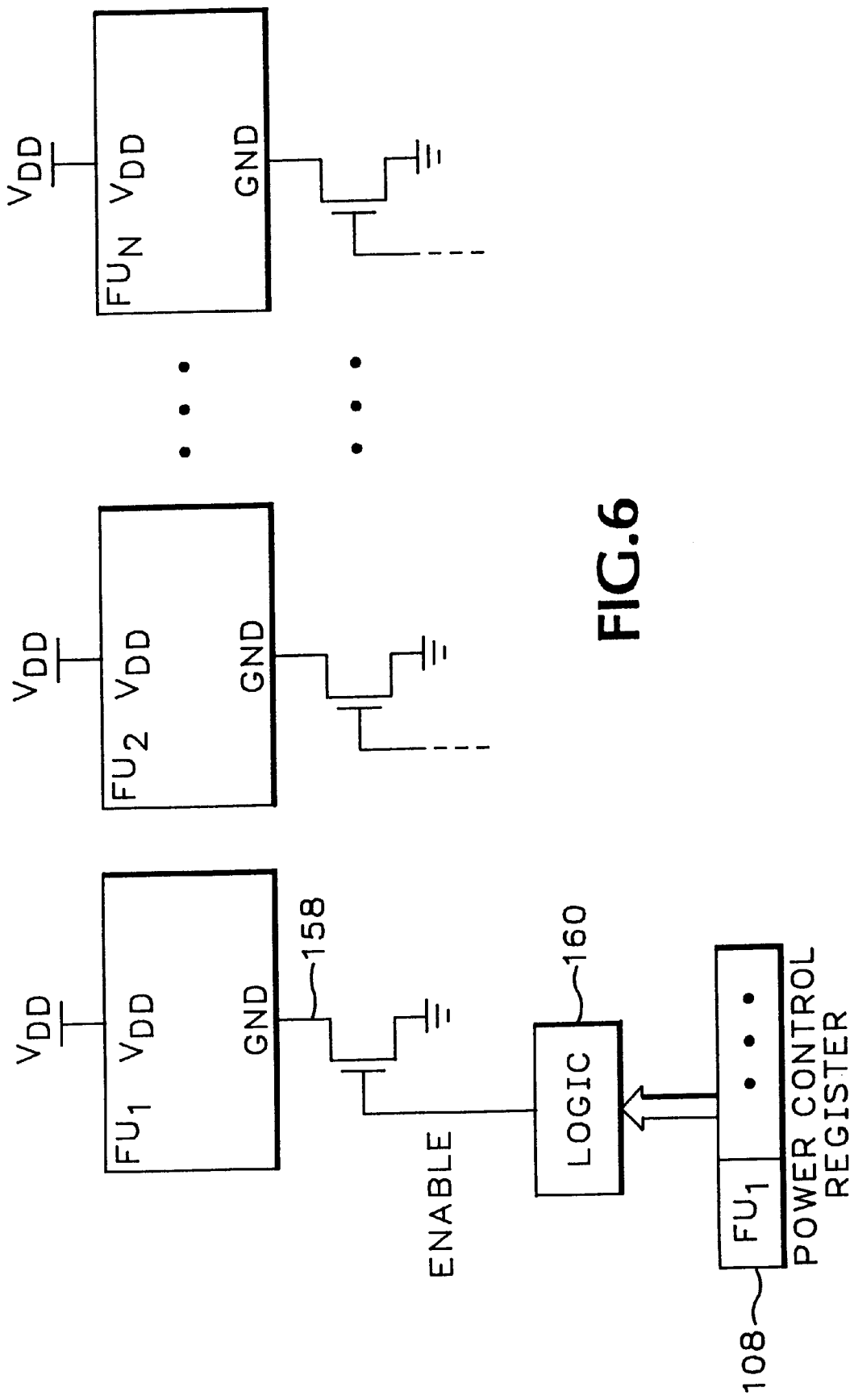
FIG. 6 is a block diagram schematic of a fourth aspect of the power management capability of the microprocessor of FIG. 2.

Yet another approach to reducing power in the individual functional units is shown in FIG. 6. In this approach, a transistor is interposed between the functional unit and a supply voltage terminal. This approach effectively reduces the rate of execution of the functional unit to zero by disabling that functional unit. As shown in FIG. 6, a transistor 158 is interposed between a ground terminal of the functional unit and the ground of the microprocessor. The gate of the transistor 158 is coupled to a logic block 160, which provides an enable signal to the gate of the transistor responsive to the value stored in the power control register field 108. In this approach, the power control register field needs simply be only a single bit wherein the logic reduces to a simple conductor. Where the power control register field is multiple bits, however, the logic 160 will be combinational logic that will decode the predetermined value and will deassert the enable signal when that value is detected. It should be apparent to those skilled in the art that the transistor can be interposed between the positive supply $V_{dd}$ and the positive supply input of the functional unit as well. As is shown in FIG. 6, each of the other functional units has a transistor associated therewith for controlling the rate of execution thereof. These transistors are responsive to the value stored in the corresponding field in the power control register. The corresponding logic blocks and various connections are not shown to simplify the drawing.

Figure 7:
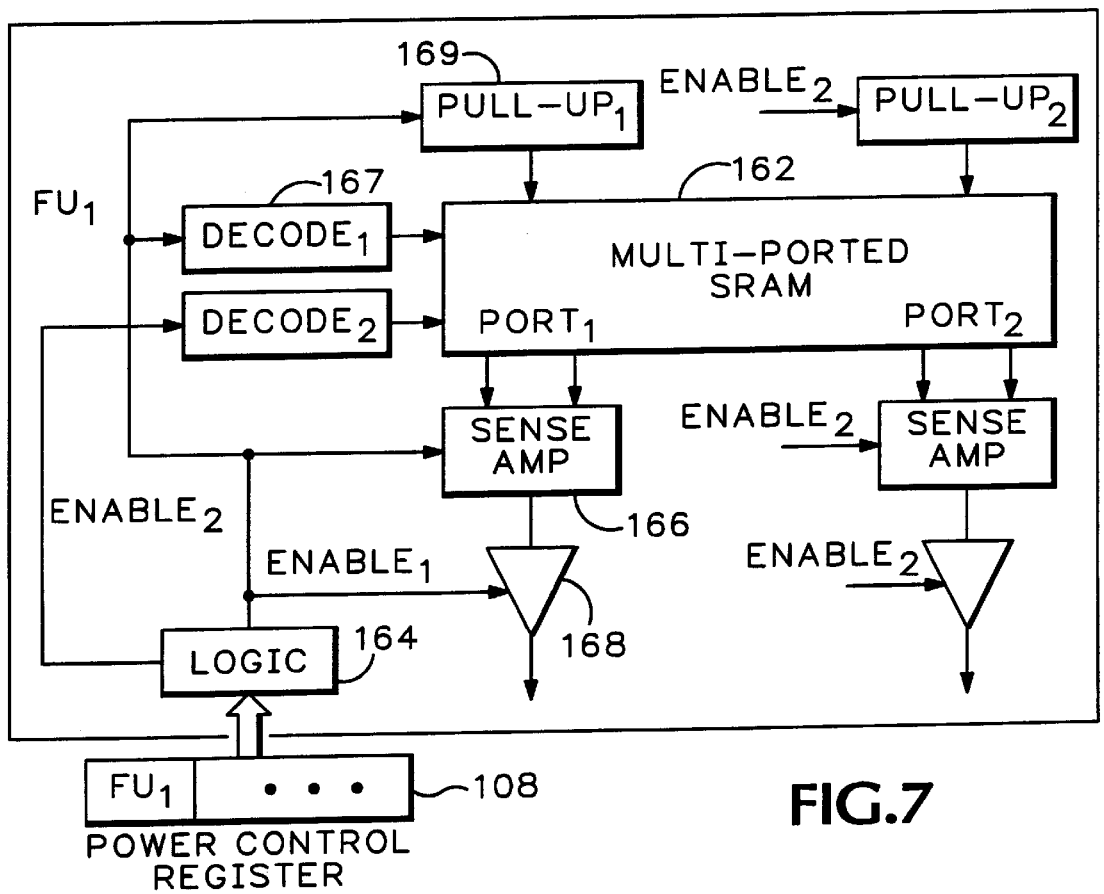
FIG. 7 is a block diagram schematic of a fifth aspect of the power management capability of the microprocessor of FIG. 2.

Referring now to FIG. 7, a different approach to adjusting the rate of execution of a functional unit responsive to the power control register field wherein that functional unit is a multiported memory is shown. Many microprocessors include multiported memories to allow for multiple concurrent accesses to the memory. Typically, these memories are used in register files or in cache memories. A two ported static random access memory (SRAM) 162 is shown in FIG. 7. Associated with each port ($PORT_1$ and $PORT_2$ is a sense amp, a driver, an address decoder and pull-up transistors, as is known in the art.

In this approach, the sense amp, driver, decoder and pull-up transistors for one or both of the ports is selectively disabled responsive to a value stored in the power control register field 108. A logic block 164 is coupled to the register field 108 to decode the value stored therein. When the logic 164 detects a predetermined value stored in the power control register, the logic block 164 disables the sense amp 166, decoder 167, buffer 168, and pull-ups 169 by deasserting an enable signal ($ENABLE_1$) provided to those components associated with the first port. These components are thereby disabled thus reducing the power consumed by the first port.

The logic block 164 also produces a second enable signal ($ENABLE_2$), which controls the components associated with the second port ($PORT_2$) in an identical manner. The $ENABLE_1$ and $ENABLE_2$ signals can be asserted/deasserted responsive to the same or different values stored in the power control register depending on the number of bits and resolution in the field 108. Alternatively, different fields can be assigned to each memory port. By selectively enabling and disabling these components, the execution rate and therefore the power dissipation of the functional unit $FU_1$ can be adjusted accordingly.

Figure 8:
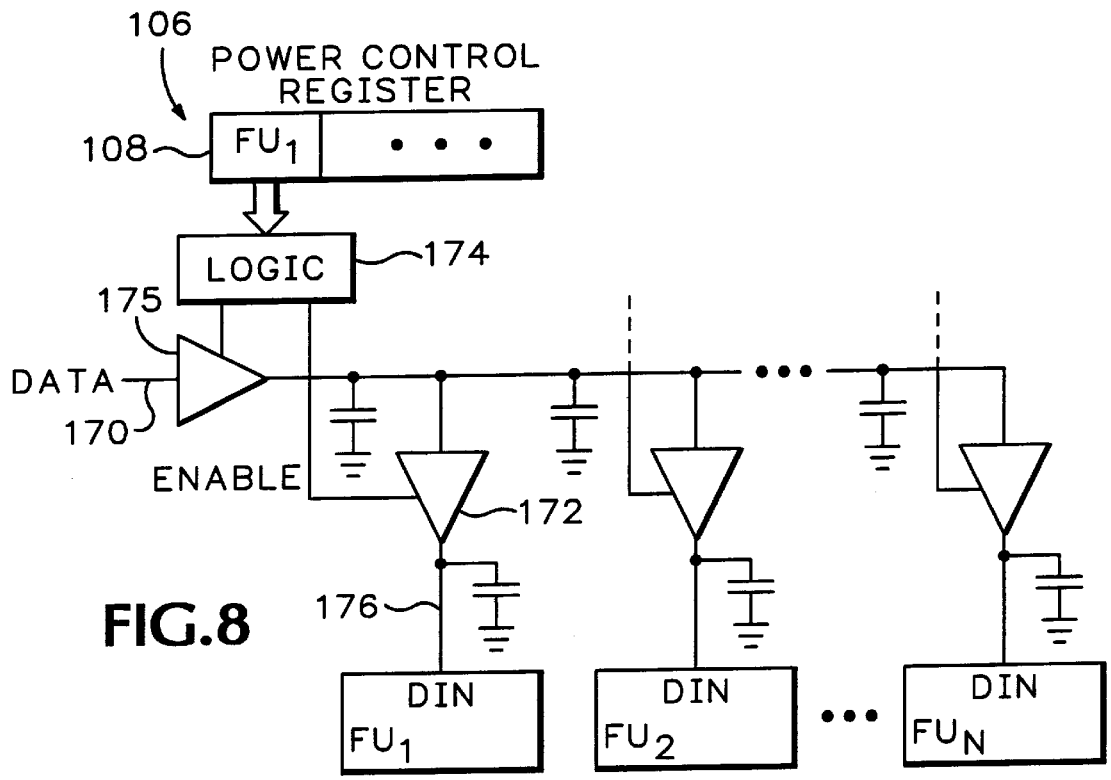
FIG. 8 is a block diagram schematic of a sixth aspect of the power management capability of the microprocessor of FIG. 2.

A further approach that can be used to control the amount of power consumed by the microprocessor is shown in FIG. 8. In this approach, data is selectively removed from the functional units responsive to the value stored in the corresponding field in the power control register. This is accomplished by tri-stating or disabling a buffer that couples the data to the functional unit. For example, as shown in FIG. 8, a data bus 170 is coupled to the various functional units via tri-state buffers such as buffer 172. A logic block 174 is coupled between the power control register field 108 corresponding to functional unit $FU_1$ and the tri-state buffer 172. The logic block 174 selectively disables the buffer 172 by deasserting an enable signal ENABLE provided to the buffer responsive to a predetermined value detected in the register field 108. By disabling the buffer 172, the power consumed by charging and discharging the parasitic capacitances on bus 176 and the power consumed by the logic coupled to that bus can be reduced. This again can be thought of as adjusting the rate of execution of the functional unit since the functional unit cannot execute without data.

Alternatively, the data bus itself can be considered a functional unit, albeit a degenerate one. In this case, the data bus can be completely shut down by disabling a tri-state buffer 175 that removes data from all of the functional units simultaneously. This eliminates the power consumed by the charging and discharging of the parasitic capacitances on the data bus.

Figure 9:
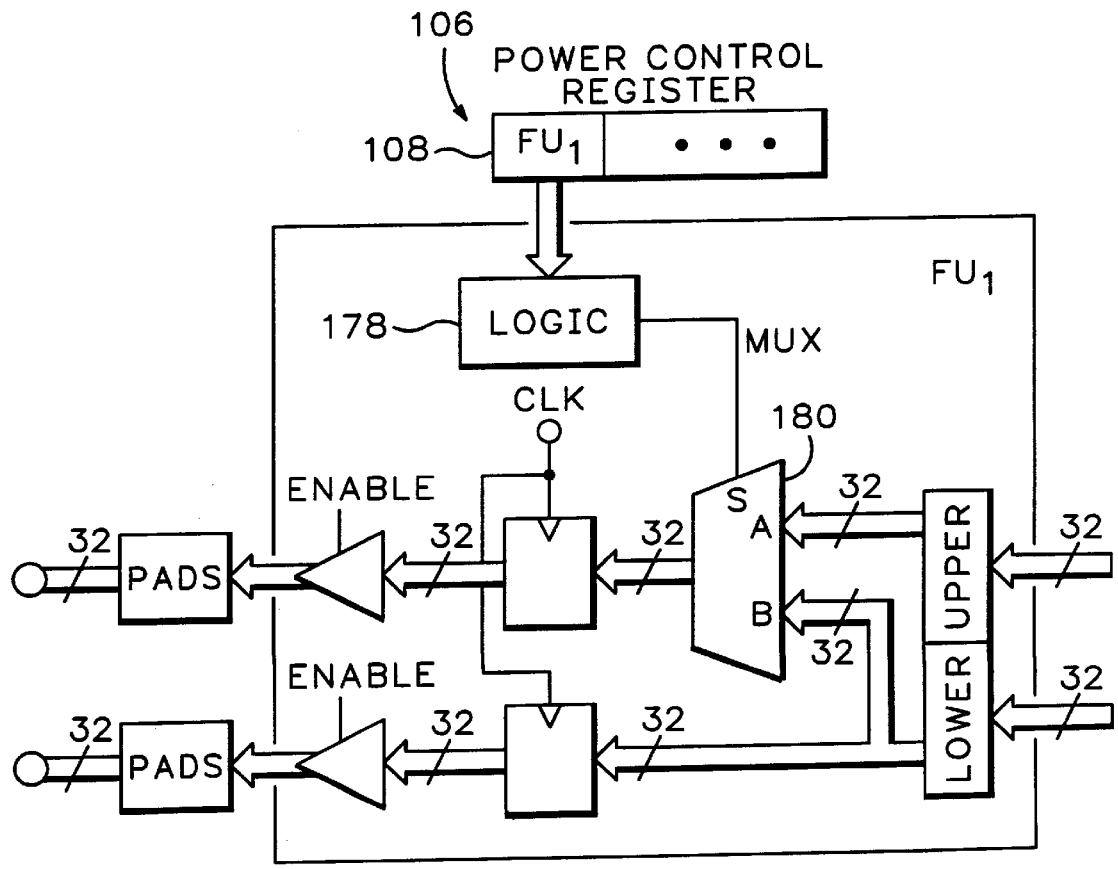
FIG. 9 is a block diagram schematic of a seventh aspect of the power management capability of the microprocessor of FIG. 2.

A yet further approach to adjusting the rate of execution and therefore the power dissipation or consumption is shown in FIG. 9 where the functional unit is an I/O unit. In this approach the external interface to the microprocessor is toggled between a 32-bit interface and a 64-bit interface. A logic block 178 produces a MUX signal that is provided to a select input of a multiplexer 180. The multiplexer 180 operates in the conventional manner of supplying either the data provided at its A input or the data supplied at its B input depending upon the state of the select signal, i.e., MUX. The multiplexer 180 allows all 64 bits of data to be output in two successive 32-bit words by toggling between the A and B inputs responsive to the MUX signal.

The logic block 178 generates the MUX signal responsive to the value stored in the power control register field 108 among other things. The power control register field 108 can therefore be used to switch the functional unit, and therefore the microprocessor, between a 32-bit and a 64-bit interface, which produces a corresponding change in the power consumption due to the reduced number of data lines that are driven. This is similar to the dynamic bus sizing techniques used, for example, in the Motorola 68040 microprocessor except that the bus sizing in the invention is done responsive to the value stored in the power control register and not to some external input provided to the microprocessor.

Figure 10:
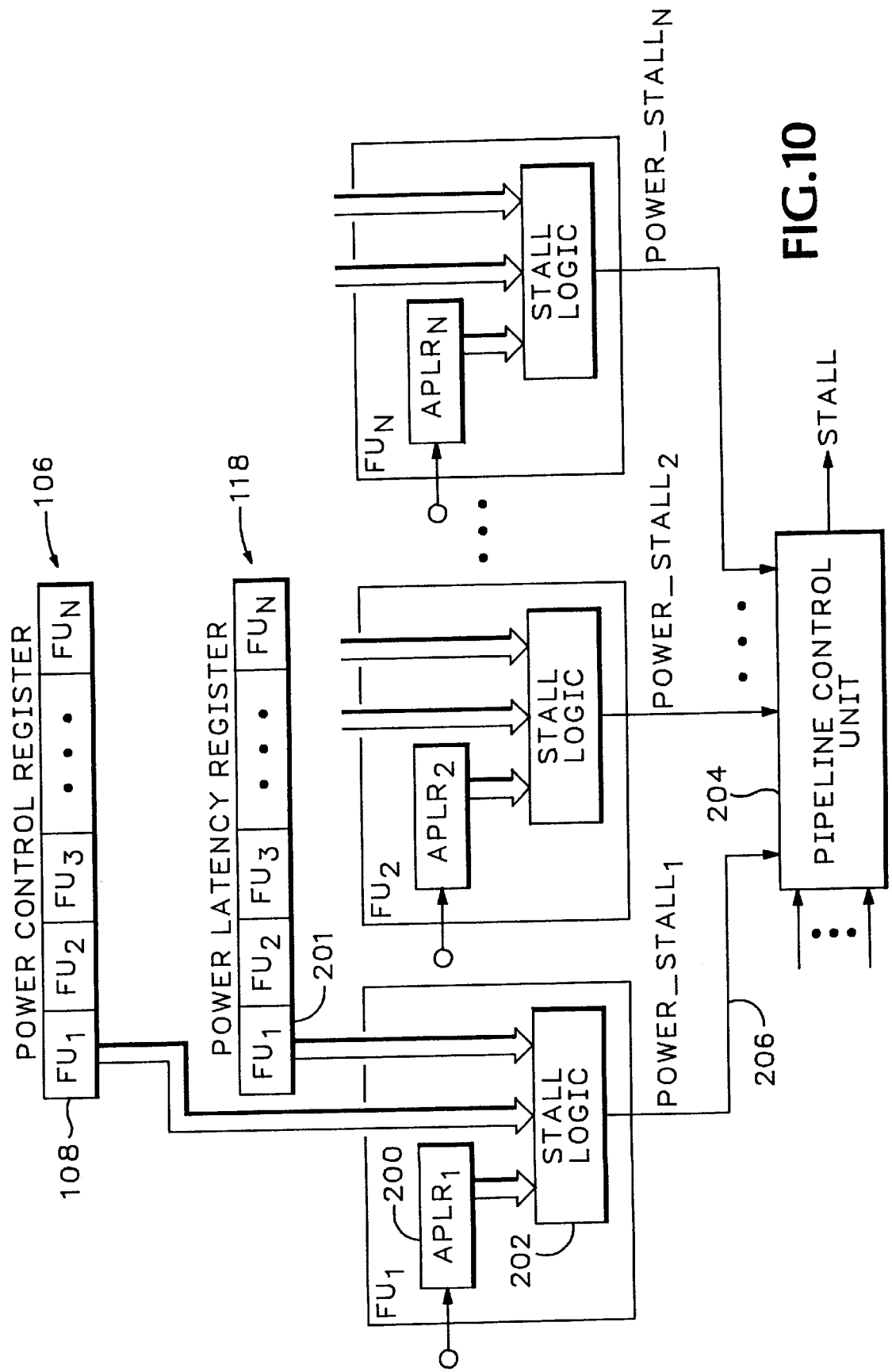
FIG. 10 is a block diagram schematic of a second aspect of the invention.
Figure 11:
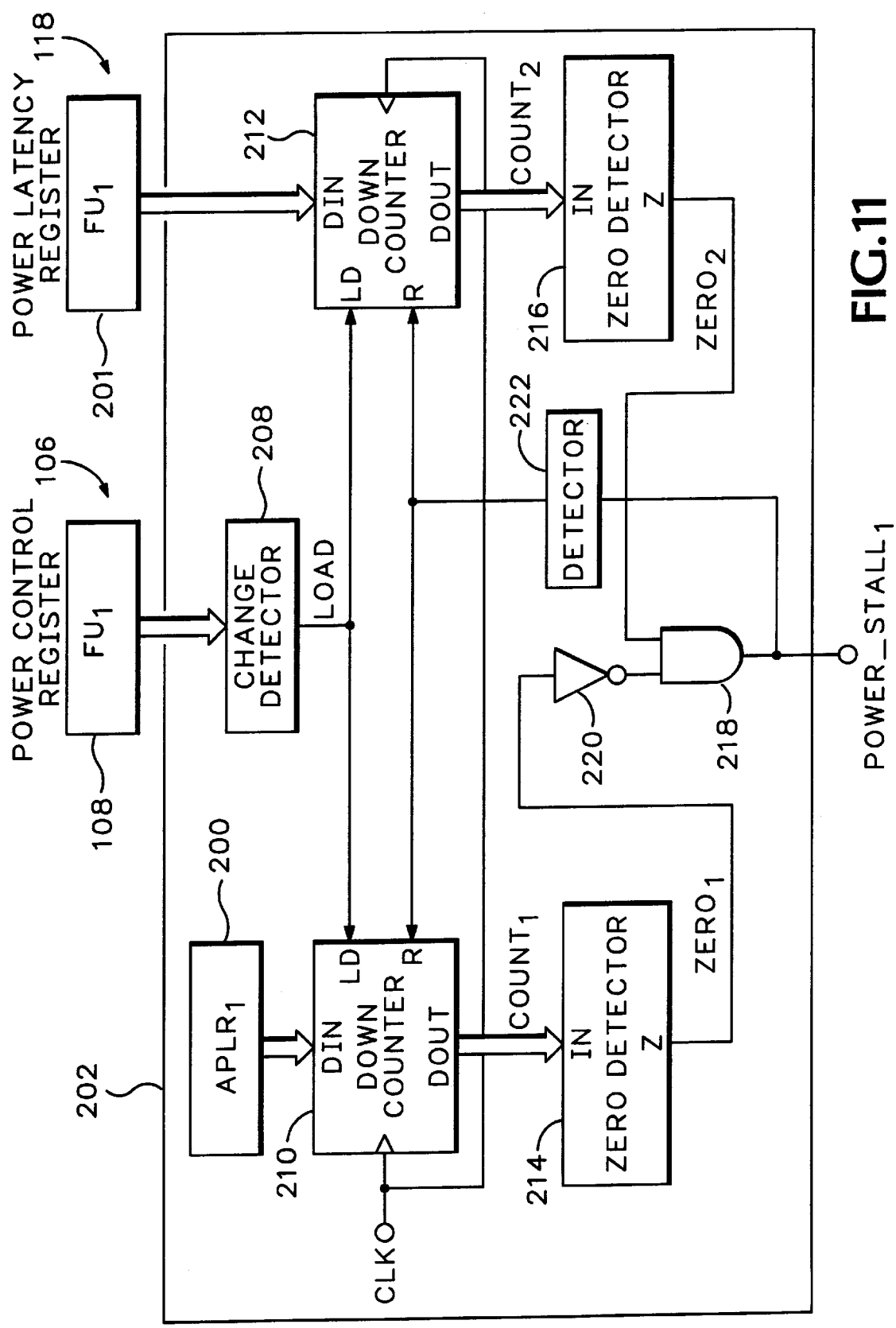
FIG. 11 is a block diagram schematic of the stall logic block of FIG. 10.

Another aspect of the invention is shown in FIGS. 10 and 11. It should be apparent to those skilled in the art that depending upon which of the above-described approaches are used, the functional unit will not be immediately available or operational even after the corresponding power control register field has been changed to place the functional unit in a full power or normal power mode. For example, where power is reapplied to the functional unit by storing the appropriate value in the power control register field, it may be several clock cycles before the functional unit can execute or perform its function. Thus, if an instruction is issued to it prematurely, the result produced thereby will be erroneous. Accordingly, the invention includes the power latency register 118 and associated logic within the functional unit to stall the microprocessor pipeline in the event this condition occurs. This approach differs from the prior art in that the functional units do not monitor the instructions, which imposes a tremendous hardware burden on the functional units, but instead perform a simple comparison between an actual power latency register value stored in the functional unit and a corresponding power latency register field in the power latency register 118.

As shown in FIG. 10, each functional unit includes an actual power latency register and a stall logic block. The actual power latency register includes a value that represents the actual number of clock cycles required for the functional unit to become fully operational after the functional unit has gone from a reduced operational state to a more fully operational state. As will be apparent from the description above, this corresponds to the situation where the corresponding power control register field, which controls the rate of execution of the functional unit, changes from a value corresponding to a reduced power state and to one corresponding to a full power state. The corresponding field in the power latency register 118, on the other hand, corresponds to an assumption made by a compiler as to what the actual power latency register value is. The compiler uses this assumption to ensure that instructions are not issued to that functional unit before this number of cycles has expired after the corresponding power control register field has been changed to a full operational value. This offloads the responsibility of checking the instructions from the functional unit to the compiler. This is a superior approach to that of the prior art because the functional units need not dynamically monitor instructions. This approach is similar to that described in our co-pending, commonly-assigned application entitled "Method and Apparatus for Simplifying Interlock Hardware," Ser. No. 08/059,041, filed May 6, 1993, incorporated herein by reference.

A problem can occur, however, where the assumption made by the compiler does not match that specified by the actual power latency register. In such a case, the functional unit must stall the microprocessor to allow the functional unit to become fully operational as specified by the value stored in the actual power latency register. The logic necessary to implement this is shown in FIGS. 10 and 11.

In FIG. 10, each functional unit is shown having an actual power latency register (APLR) and associated stall logic. For example, functional unit $FU_1$ includes an actual power latency register 200 and associated logic 202. The stall logic 202 includes three inputs: one coupled to the register 200 to receive the actual power latency value, a second input coupled to the corresponding field in the power latency register 118 to receive the assumed latency value, and a third input coupled to the corresponding field 108 in the power control register 106. The stall logic needs to monitor the power control register field 108 to detect when the value stored therein has been changed to the value corresponding to an increase in the operational state. In the preferred embodiment, this corresponds to the case where the functional unit is placed into a fully operational or normal state. However, this value can correspond to any operational state or even a number of states in which the functional unit is operational.

The stall logic 202 produces a stall signal $POWER\_STALL_1$ that is provided to a pipeline control unit 204 that controls a multistage pipeline in the microprocessor. The signal line 206 provides this power stall signal to the pipeline control unit 204. The stall logic asserts the power stall signal $POWER\_STALL_1$ where the compiler has made an erroneous assumption about the actual power latency value. This signal remains asserted until the required number of cycles have expired, as specified by the actual power latency register value, after the corresponding power control register field 108 has been changed from a low power or reduced power value to a fully or normal operational value. The other functional units also produce power stall signals ($POWER\_STALL_2 \ldots POWER\_STALL_n$) under similar conditions.

The pipeline control unit 204 produces a stall signal when any of these power stall signals are asserted or when any of the other sources of stalls produces a corresponding stall condition. These other sources of stalls can include control or data hazards, as is known in the art. The pipeline in the microprocessor is stalled until the stall signal is deasserted. Implementation of the pipelining control unit 204 is known in the art and is therefore not discussed herein. See, e.g., John L. Hennessy & David A. Patterson, *Computer Architecture:A Quantitative Approach* 251–343 (1990).

A block diagram schematic of the stall logic 202 is shown in FIG. 11. The stall logic 202 includes a change detector circuit 208 that is coupled to the power control register 108 to detect when that field changes from a reduced or low power value to a full or normal power value. The output of the change detector is coupled to two loadable downcounters 210 and 212. The change detector 208 produces a load signal that causes the counters 210 and 212 to load the values presented at their data in (DIN) input. For the counter 210, the value that is loaded is the value stored in the actual power latency register 200 and for the counter 212 the value stored in the power latency register field 201. Both of these counters 210 and 212 have clock inputs that are clocked by the system clock CLK. The counters 210 and 212 further include a data output (DOUT) that is the current count of the counter. Thus, after the counter has been loaded, the data output value corresponds to that loaded in the counter. As the counter is decremented, the value on the data output corresponds to the decremented value.

The data output of the counter 210 $COUNT_1$ is provided to a zero detector 214 which produces a signal $ZERO_1$ when the data output $COUNT_1$ is equal to zero. Similarly, zero detector 216 is coupled to downcounter 212 to detect when the data output of the counter is equal to zero. When the $COUNT_2$ signal produced by the counter 212 is equal to zero, the zero detector 216 asserts a signal $ZERO_2$.

The output signal $ZERO_1$ is provided to an AND gate 218 through an invertor 220 while the output signal $ZERO_2$ is provided to the AND gate 218 directly. The AND gate 218 produces the stall signal $POWER\_STALL_1$ when the signal $ZERO_2$ is asserted and $ZERO_1$ is not asserted. This condition corresponds to the situation where the downcounter 212 has counted down before downcounter 210. This occurs where the value stored in the power latency register field 201 is lesser than the actual power latency value stored in register 200. In that case, the signal $POWER\_STALL_1$ remains asserted until the counter 210 counts down to zero. Thus, the signal $POWER\_STALL_1$ remains asserted for a number of clocks like those equal to the difference between the value stored and the power latency register field 201 and that stored in the actual power latency register 200. After this number of cycles, the signal $POWER\_STALL_1$ is deasserted and the hazard has passed. A detector 222 detects a 1 to 0 transition on $POWER\_STALL_1$ and resets the downcounters 210 and 212 responsive thereto. Thus, the stall logic 202 ensures that the functional unit is fully operational before any instructions are issued to it. This is accomplished without explicitly monitoring the instructions as is done in the PowerPC microprocessor by IBM, Motorola and Apple.

The value stored in the actual power latency register can be made available to the software to allow the software to change the contents of the corresponding power latency register value stored therein. This can be accomplished by an instruction that reads the contents of the actual power latency register, much in the same way that other control registers are read (e.g., status register). This capability allows generic code to be written for multiple versions of a microprocessor, where each has different actual latency values. The code can then write the appropriate value to the power latency register fields.

The microprocessor 100 with the power control register and the associated means for adjusting the rate of the execution units allows software to adjust or control the power dissipation of the microprocessor. This is advantageous over hardware because software can look much further into the future to determine what function units will be required in the future. Those that will not be required can be set to a low power or no power state by setting the appropriate value in the corresponding power control register field. This capability further allows the software to attempt to keep the power dissipation below a predetermined amount by serializing tasks that could otherwise be done in parallel. Although this would reduce the performance of the microprocessor, it would help to reduce power, thereby allowing the same silicon die to be used in a variety of different packages including low cost plastic packages or those without heat sinks. Certain functional units could even be permanently disabled or put into a low power state by setting the value during manufacturing of or the wafer or packaging of the part to ensure that the silicon did not dissipate more power than is allowed for the package. The software could then sense this setting and serialize the task accordingly.

Figure 1:
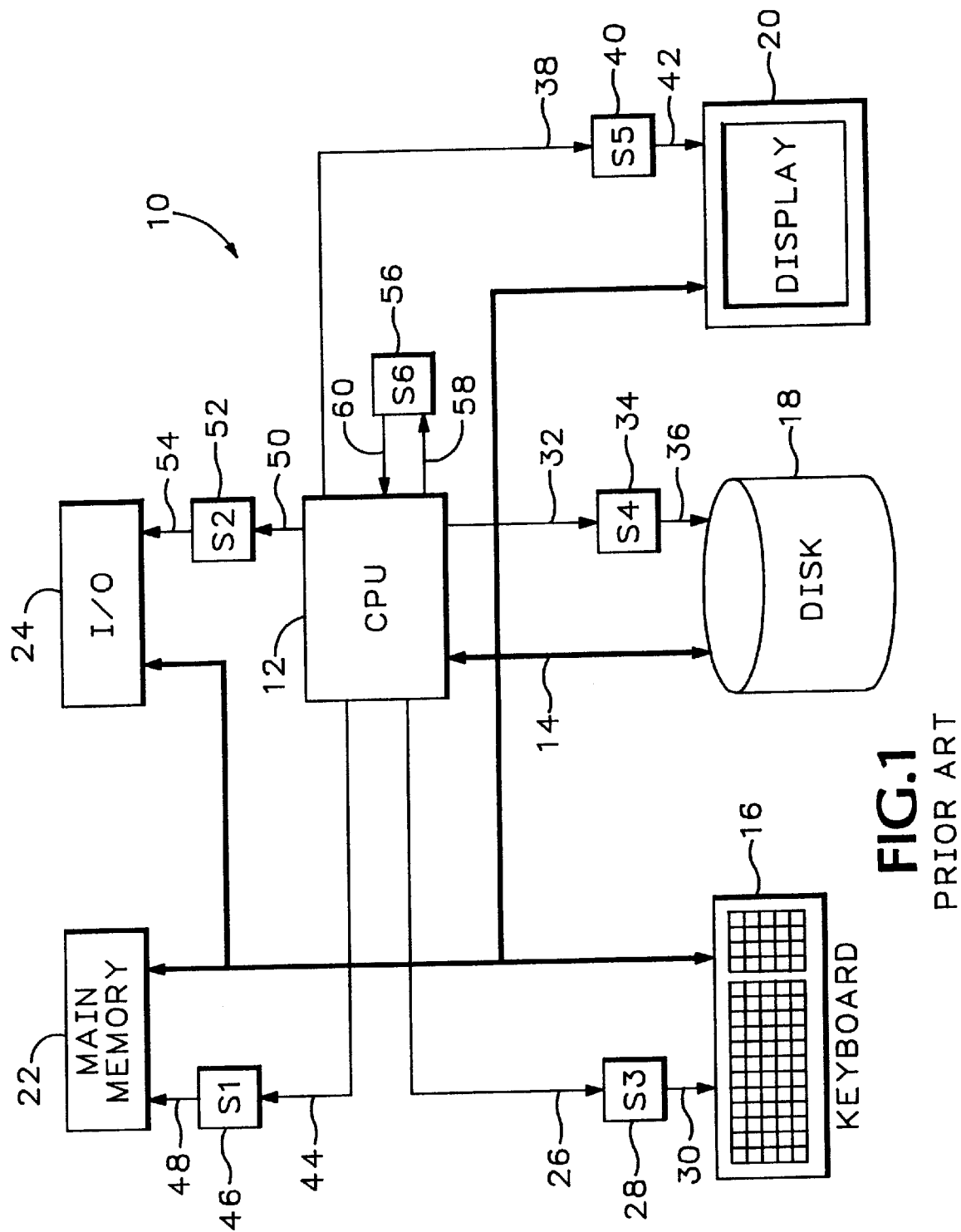
FIG. 1 is a prior art computer system having power management capabilities.

The microprocessor can be used in conventional computer systems such as that shown in FIG. 1. The software that writes to the power control register is then stored in main memory 22. The power management techniques taught herein can be used in conjunction with the system level approaches provided by the prior art to produce improved power management at the microprocessor and system levels.

Having described and illustrated the principles of the invention in a preferred embodiment thereof, it should be apparent that the invention can be modified in arrangement and detail without departing from such principles. We claim all modifications and variation coming within the spirit and scope of the following claims.

We claim:

1. A microprocessor operable when coupled to an instruction memory containing a series of instructions, the microprocesser comprising:

a plurality of functional units within the microprocessor including a subset of functional units having variable execution rates;

a power register within the microprocessor having a plurality of power register fields, each power register field uniquely corresponding to a functional unit of the subset of functional units having variable execution rates, wherein each one of the plurality of power register fields is configured to receive and store a power control value for its corresponding functional unit responsive to one of the series of instructions; and power control logic circuitry within the microprocessor coupled to the power register and configured to adjust the rate of execution of each individual functional unit of the subset of functional units having variable execution rates responsive to the power control value stored in the power register field uniquely corresponding to that individual functional unit so that the power dissipated by each functional unit of the subset of functional units having variable execution rates is individually determined solely by the power control value stored in its corresponding power register field.

2. A microprocessor according to claim 1 wherein the value in each power register field is set during manufacturing of the microprocessor.

3. A microprocessor according to claim 2 wherein the value in each power register field is set during semiconductor fabrication of the microprocessor.

4. A microprocessor according to claim 2 wherein the value in each power register field is set during packaging of the microprocessor.

5. A microprocessor according to claim 1 wherein the value in each power register field is set by software executed by the microprocessor.

6. A microprocessor according to claim 1 wherein the microprocessor includes a pipeline and further including means for stalling the pipeline responsive to the value stored in one of the plurality of power register fields.

7. A microprocessor according to claim 1 wherein the power control logic circuitry includes a transistor interposed between one of the subset of functional units and a supply voltage terminal such that the transistor isolates the supply voltage terminal from the one of the subset of functional units responsive to the value in the corresponding power register field.

8. A microprocessor according to claim 1 wherein the power control logic circuitry includes a buffer circuit which disables transitions on data inputs to the functional unit responsive to the value stored in the corresponding power register field.

9. A microprocessor according to claim 1 further including a clocking circuit for generating a clock signal and supplying said clock signal to the functional units, wherein the power control logic circuitry includes a clock divider circuit interposed between the clocking circuit and one of the subset of functional units such that the clock divider circuit divides the clock signal responsive to the value in the power register field corresponding to the one of the subset of functional units.

10. A microprocessor according to claim 9 wherein the the clock divider circuit adjusts the rate of the clock signal to zero responsive to the value in the power register field.

11. A microprocessor according to claim 1 further including a power latency register having a latency field for storing a latency value corresponding to a number of clock cycles after the value stored in a corresponding power register field has been adjusted that a compiler assumes that the functional unit corresponding to the power register field is available, the functional unit including means for stalling its execution until the functional unit is available after the value stored in the corresponding power register field in the power control register has been changed to place the functional unit in a normal state.

12. A microprocessor according to claim 11 wherein the power latency register includes a plurality of latency fields for storing a plurality of latency values, each latency value corresponding to a respective functional unit.

13. A computer having internal power management features comprising:
- a microprocessor having a plurality of functional units within the microprocessor, a power control register within the microprocessor having a plurality of power register fields, each field corresponding to a corresponding one of the functional units;
- a memory coupled to the microprocessor for storing instructions executable by the microprocessor;
- executable code stored in the memory, the microprocessor being responsive to the code to store values in each of the power register fields for individually controlling the level of power consumption of one of the functional units according to its corresponding power register field; and
- power control logic circuitry configured to independently adjust the rate of execution of each one of the functional units having a corresponding power register field responsive to the value stored in the corresponding power register field so that the power dissipated by each of the functional units is independently adjusted by the value stored in the corresponding power register field.

14. A computer according to claim 13 wherein the microprocessor includes a clocking circuit that generates a clock signal that is provided to at least one of the plurality of functional units, and wherein the power control logic circuitry includes a clock divider circuit interposed one of the functional units and the clocking circuit and configured to divide the clock signal responsive to the value in the power register field corresponding to the functional unit.

15. A computer according to claim 14 wherein the clock divider circuit adjusts the frequency of the clock signal to a fraction of a maximum frequency responsive to a first stored value in the corresponding power register field.

16. A computer according to claim 15 wherein the clock divider circuit adjusts the frequency of the clock signal to zero responsive to a second stored value in the corresponding power register field.

17. A computer having internal power management features comprising:
- a microprocessor having a plurality of functional units within the microprocessor, a power control register within the microprocessor having a plurality of power control register fields, each field corresponding to a corresponding one of the functional units;
- a memory coupled to the microprocessor for storing instructions executable by the microprocessor;
- executable code stored in the memory, the microprocessor being responsive to the code to store values in the power control register fields for independently controlling the level of power consumption of the corresponding functional units;
- power control logic circuitry configured to adjust the rate of execution of each one of the functional units having a corresponding power control register field responsive to the value stored in the corresponding power control register field so that the power dissipated by the corresponding functional unit is independently adjusted by the value in the corresponding power control register; and
- a buffer configured to reduce the width of a data bus interface from a first number of bits to a second number of bits responsive to the value stored in one of the plurality of power control register fields.

18. A computer according to claim 13 wherein the microprocessor includes a latency register having at least one latency register field corresponding to one of the functional units, the latency register field storing a latency value corresponding to a number of clock cycles after the value stored in a corresponding one of the plurality power register fields has been adjusted that a compiler assumes the corresponding functional unit is available, the corresponding functional unit including means for stalling its execution until the functional unit is available if an instruction is issued to the functional unit after the number of clock cycles specified by the latency value but where the functional unit is not available for execution.

19. A computer according to claim 18 wherein the microprocessor includes a multi-stage pipeline and wherein the functional unit corresponding to the latency register field inserts a number of stalls in the pipeline responsive to the value stored in the corresponding one of the plurality of power register fields.

20. A method of minimizing power consumption in a computer including a microprocessor having a plurality of functional units within the microprocessor, the method comprising:
- providing the microprocessor with a power control register within the microprocessor having a plurality of fields, each field corresponding to a functional unit;
- using software or firmware to independently vary a value in each power register field responsive to the nature of an instruction to be executed by the microprocessor; and adjusting the rate of execution of one of the functional units in accordance with the value stored in the corresponding field in order to adjust the power consumed by the microprocessor.

21. A method of minimizing power consumption according to claim 20, wherein adjusting the rate of execution of each functional unit includes dividing rate of a clock signal provided to at least one functional unit downward to one of at least two different predetermined fractions of the rate.

22. A method of minimizing power consumption according to claim 20, wherein adjusting the rate of execution of one of the functional units includes tri-stating a bus coupled to the functional unit responsive to the value stored in the power register field corresponding to the functional unit.

23. A method of minimizing power consumption according to claim 20, wherein storing a power control value in the microprocessor includes storing a value for each functional unit in a power control register.

24. A method of minimizing power consumption in a computer including a microprocessor having a plurality of functional units within the microprocessor, the method comprising:

providing the microprocessor with a power control register within the microprocessor having a plurality of fields, each field corresponding to a functional unit;

storing a value in each power register field responsive to an instruction executed by the microprocessor; and adjusting the rate of execution of one of the functional units in accordance with the value stored in the corresponding field in order to adjust the power consumed by the microprocessor wherein;

storing a value in each power register field includes imbedding into code for a program to be executed by the microprocessor, instructions which control rate of execution of the functional units; and adjusting the rate of execution of one of the functional units in accordance with the value stored in the corresponding field includes responsive to a first of said instructions, adjusting the rate of execution of a selected one of the functional units to reduce its power consumption while other functional units execute the program according to code corresponding to said units, and responsive to a second of said instructions adjusting the rate of execution of the selected functional unit to full power to execute a portion of the code executable by the selected functional unit.

25. A method of minimizing power consumption according to claim 24, including storing a power latency value and controlling the adjusting of the rate of execution of the selected functional unit to full power according to the power latency value.

26. A method of minimizing power consumption according to claim 24, including:

storing an assumed power latency value and an actual power latency value;

comparing said values to determine readiness of the selected functional unit to operate at full power; and if the selected functional unit is not ready when it is time for the selected functional unit to execute said portion of the code, temporarily stalling operation of the microprocessor, until the selected functional unit is at full power.

27. The computer having internal power management features of claim 17 wherein the means for reducing the width of a data bus interface from a first number of bits to a second number of bits further comprises:

a logic block configured to receive the value from the one of the plurality of power control register fields corresponding to the data bus and generate a multiplexor control signal responsive thereto;

a multiplexor having a first input configured to receive a first internal bus interface of the second number of bits and a second input configured to receive a second internal bus interface of the second number of bits, wherein the multiplexor is further configured to receive the multiplexer control signal and, responsive thereto, select one of the first and second internal bus interfaces for output onto the data bus interface such that the first and second internal bus interfaces are output successively onto the data bus interface.

28. The computer having internal power management features of claim 17 wherein:

the microprocessor further includes:

a latency register having a latency register field corresponding to the data bus interface, a pipeline control unit configured to stall an execution pipeline of the computer, and the microprocessor being responsive to the executable code stored in the memory to store values in the latency register field corresponding to the data bus interface; and the means for reducing the width of a data bus interface from a first number of bits to a second number of bits further includes:

an actual power latency register configured to store an actual power latency value, and stall logic configured to receive the actual power latency value, the value in the latency register field corresponding to the data bus interface, and the value in the power control register field corresponding to the data bus interface, wherein the stall logic is configured to detect when the value in the power control register field corresponding to the data bus interface has been changed to a value corresponding to an increase in the operational state, and further wherein the stall logic is configured to generate a stall signal which is output to the pipeline control unit when the value in the latency register field corresponding to the data bus interface is less than the actual power latency value.

29. A microprocessor according to claim 1, wherein the power control register is updatable responsive to a power control type instruction in the series of instructions.

30. A microprocessor according to claim 1, wherein all of the plurality of power register fields in the power register are updatable responsive to a power control type instruction.

31. A microprocessor according to claim 1, wherein a selected one of the plurality of power register fields in the power register is updatable responsive to an associated power control type instruction and the remaining ones of the plurality of power register fields remain unchanged.

32. A method for controlling power consumption of a plurality of functional units in a microprocessor, the method comprising:

coupling power control circuitry to the plurality of functional units, the power control circuitry being adapted to individually adjust the power consumption of each one of the plurality of functional units;

coupling a power control register having a plurality of fields to the power control circuitry, where each one of the plurality of field of the power control register corresponds to one of the plurality of functional units;

independently adjusting the power consumption of each one of the plurality of functional units responsive to a value in the corresponding field of the power control register; and setting the value in each one of the fields of the power control register responsive to a computer executable instruction.

33. The method of claim 32, wherein setting the value in each one of the fields of the power control register includes determining the value in each field of the power control register based upon whether the corresponding one of the plurality of functional units is utilized in a code segment to be executed.

34. The method of claim 33, wherein determining the value in each field of the power control register includes setting the value in each field of the power control register to stop a clock signal input to the corresponding one of the plurality of functional units is not utilized in the code segment to be executed.

35. The method of claim 34, wherein determining the value in each field of the power control register includes setting the value in each field of the power control register to restore the clock signal input to the corresponding one of the plurality of functional units in advance of when the functional unit is to be utilized in the code segment to be executed.

36. The method of claim 35, wherein the step of setting the value in each field of the power control register to restore the clock signal includes restoring the clock signal in advance of when the functional unit is to be utilized in the code segment to be executed by a predetermined latency period of the functional unit.

* * * * *